United States Patent
Guo et al.

(10) Patent No.: US 9,507,071 B1
(45) Date of Patent: Nov. 29, 2016

(54) LIGHT GUIDE PLATE AND BACKLIGHT MODULE

(71) Applicant: Wuhan China Star Optoelectronics Technology Co., Ltd., Wuhan (CN)

(72) Inventors: Wei Guo, Wuhan (CN); Jie Zeng, Wuhan (CN); Gege Zhou, Wuhan (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 5 days.

(21) Appl. No.: 14/761,623

(22) PCT Filed: Jun. 25, 2015

(86) PCT No.: PCT/CN2015/082269
§ 371 (c)(1),
(2) Date: Jul. 17, 2015

(30) Foreign Application Priority Data

May 20, 2015 (CN) .......................... 2015 1 0260725

(51) Int. Cl.
*G02B 6/00* (2006.01)
*F21V 8/00* (2006.01)

(52) U.S. Cl.
CPC ............. *G02B 6/002* (2013.01); *G02B 6/0055* (2013.01); *G02B 6/0088* (2013.01)

(58) Field of Classification Search
CPC .. G02B 6/002; G02B 6/0058; G02B 6/0045; G02B 6/0048; G02B 6/0046; G02B 6/0055; G02B 6/0088
USPC ......................................................... 362/621
See application file for complete search history.

(56) References Cited

U.S. PATENT DOCUMENTS

| | | | |
|---|---|---|---|
| 6,273,577 B1 * | 8/2001 | Goto ........................ | F21S 19/00 349/65 |
| 7,766,498 B2 * | 8/2010 | Sampsell ............. | G02B 6/0018 349/112 |
| 2013/0208506 A1 * | 8/2013 | Ye .......................... | G02B 6/002 362/609 |

\* cited by examiner

*Primary Examiner* — Karabi Guharay
(74) *Attorney, Agent, or Firm* — Leong C. Lei

(57) ABSTRACT

A light guide plate has a light incident surface having an arc configuration and also includes upper and lower surfaces that are respectively provided with a first slope surface and a second slope surface, so that light passes through and is converged by the arc light incident surface and is subjected to total internal reflection at the first and second slope surfaces to have the light guided into the light guide plate and then projecting out through a light exit surface. The light guide plate demonstrates an excellent effect of convergence for light of all angles, so that the light guide plate can be structured thinner without deteriorating light coupling efficiency. Also provided is a backlight module, which involves the light guide plate.

15 Claims, 2 Drawing Sheets

LIGHT GUIDE PLATE AND BACKLIGHT MODULE

BACKGROUND OF THE INVENTION

1. Field of the Invention

The present invention relates to the field of display technology, and in particular to a light guide plate and a backlight module.

2. The Related Arts

Liquid crystal displays (LCDs) have a variety of advantages, such as thin device body, low power consumption, and being free of radiation, and are thus of wide applications, such as mobile phones, personal digital assistants (PDAs), digital cameras, computer monitors, and notebook computer screens.

Most of the liquid crystal displays that are currently available in the market are backlighting liquid crystal displays, which comprise an enclosure, a liquid crystal panel arranged in the enclosure, and a backlight module mounted in the enclosure. The structure of a conventional liquid crystal panel is made up of a color filter (CF) substrate, a thin-film transistor (TFT) array substrate, and a liquid crystal layer arranged between the two substrates and the principle of operation is that a driving voltage is applied to the two glass substrates to control rotation of the liquid crystal molecules of the liquid crystal layer in order to refract out light emitting from the backlight module to generate an image. Since the liquid crystal panel itself does not emit light, light must be provided from the backlight module in order to normally display an image. Thus, the backlight module is one of the key components of the liquid crystal displays. The backlight modules can be classified in two types, namely a side-edge backlight module and a direct backlight module, according to the location where light gets incident. The side-edge backlight module comprises an LED light bar, serving as a backlight source, which is arranged at an edge of a backplane to be located rearward of one side of the liquid crystal display panel. The LED light bar emits light that enters a light guide plate (LGP) through a light incident face at one side of the light guide plate and is projected out of a light exit face of the light guide plate, after being reflected and diffused, to pass through an optic film assembly so as to form a planar light source for the liquid crystal panel.

In a small-sized display device, to achieve a thinning design, it is often to cut down a thickness of the light guide plate. When a light emission surface of an LED light bar is arranged to have a width greater than the thickness of the light guide plate, a major portion of the light may become ineffective and thus, a wedge port must be provided at one side of the light incident surface of the light guide plate. Referring to FIG. 1, a cross-sectional view is given to illustrate a conventional light guide plate. The light guide plate comprises a first end surface 100, a second end surface 400 opposite to the first end surface 100, an upper surface 200 connected to upper edges of the first end surface 100 and the second end surface 400, and a lower surface 300 connected to lower ends of the first end surface 100 and the second end surface 400. The first end surface 100 and the second end surface 400 are both planar surfaces. The upper surface 200 is composed of three sections, which are respectively a first horizontal surface 210, a first slope surface 220, and a second horizontal surface 230. The first horizontal surface 210 is connected to the first end surface 100. The first slope surface 220 is connected, at an inclination, between the first horizontal surface 210 and the second horizontal surface 230. The lower surface 300 is, in the entirety thereof, a planar surface. The first end surface 100 is a light incident surface of the light guide plate. The second horizontal surface 230 is a light exit surface of the light guide plate.

A reference plane (indicated by a phantom line) extends from a connection point A between the first slope surface 220 and the second horizontal surface 230 to the lower surface 300. The portion of the light guide plate from the reference plane to the first end surface 100 is a light incident portion. The light incident portion of the light guide plate comprises a wedge body. The portion of the light guide plate from the reference plane to the second end surface 400 is a light guide portion. The light guide portion of the light guide plate is generally a rectangular parallelepiped. The light guide portion of the light guide plate has a thickness that is generally smaller than a thickness of the light incident portion of the light guide plate.

Arranging the light incident portion of the light guide plate in a structure of a wedge body can address the issue of ineffective light caused by a width of a light emission surface of an LED light bar being greater than a thickness of a light guide plate. Light, after entering the light incident portion of the light guide plate, is subjected to total internal reflection on the first slope surface 220 to transmit into the light guide portion of the light guide plate and then reflected by a reflector plate below the light guide plate to project out through the second horizontal surface 230.

However, with further progress of thinning of light guide plates, the thickness of the light guide portion of a light guide plate becomes thinner and thinner and a difference of thickness between the light incident portion and the light guide portion of the light guide plate becomes larger. As shown in FIG. 2, the slope of the first slope surface 200 becomes larger, making it not possible for a fraction of light that is of a large angle to transmit into the interior of the light guide plate for utilization thereby lowering down the utilization of light. For backlight modules that are of severe degree of thinning, loss of light at the light incident portion of the light guide plate is severer and some of the light becomes stray light that enters the area of an optic film assembly above the light guide plate, leading to the occurrence of bright edges. Thus, providing only a light incident portion having a structure of a wedge body on a light guide plate is just not enough to achieve an ideal light coupling efficiency.

SUMMARY OF THE INVENTION

An object of the present invention is to provide a light guide plate that increases utilization of light, provides an increased coupling efficiency, and has a reduced thickness so as to facilitate designing a thinned backlight module.

An object of the present invention is also to provide a backlight module that has increased light utilization and an increased coupling efficiency and has a simple structure and a reduced thickness.

To achieve the above object, the present invention provides a light guide plate, which comprises a first end surface, a second end surface opposite to the first end surface, an upper surface connected to upper ends of the first end surface and the second end surface, and a lower surface connected to lower ends of the first end surface and the second end surface;

wherein the first end surface comprises an arc configuration bulging outwardly of the light guide plate;

wherein the upper surface comprises three sections, which are respectively a first horizontal surface, a first slope surface, and a second horizontal surface, the first horizontal surface being connected to the first end surface, the first slope surface being connected, at an inclination, between the first horizontal surface and the second horizontal surface, the first horizontal surface and the first slope surface defining therebetween a first included angle, the first included angle being an obtuse angle;

wherein the lower surface comprises three sections, which are respectively a third horizontal surface, a second slope surface, and a fourth horizontal surface, the third horizontal surface being connected to the first end surface, the second slope surface being connected, at an inclination, between the third horizontal surface and the fourth horizontal surface, the third horizontal surface and the second slope surface defining therebetween a second included angle, the second included angle being an obtuse angle; and wherein the first end surface serves as a light incident surface of the light guide plate and the second horizontal surface serves as a light exit surface of the light guide plate.

The light guide plate comprises a light incident portion and a light guide portion, the light incident portion being of a horn-like configuration, the light guide portion being of a rectangular parallelepiped configuration.

The light incident portion comprises two portions, which are respectively a portion between the first horizontal surface and the third horizontal surface and a portion between the first slope surface and the second slope surface.

A thickness between the first horizontal surface and the third horizontal surface is constant in the entirety of the portion and a thickness between the first slope surface and the second slope surface gradually decreases in a direction from the first horizontal surface to the second horizontal surface.

The light guide portion comprises a portion between the second horizontal surface and the fourth horizontal surface, a thickness between the second horizontal surface and the fourth horizontal surface being constant in the entirety of the portion.

The first horizontal surface and the third horizontal surface correspond to each other and are of the same size; the first slope surface and the second slope surface correspond to each other and are of the same size; and the third horizontal surface and the fourth horizontal surface correspond to each other and are of the same size.

The first included angle and the second included angle are of the same angle.

The second slope surface is coated with black ink jet, white ink jet, or alternatively arranged black and white ink jets.

The present invention also provides a light guide plate, which comprises a first end surface, a second end surface opposite to the first end surface, an upper surface connected to upper ends of the first end surface and the second end surface, and a lower surface connected to lower ends of the first end surface and the second end surface;

wherein the first end surface comprises an arc configuration bulging outwardly of the light guide plate;

wherein the upper surface comprises three sections, which are respectively a first horizontal surface, a first slope surface, and a second horizontal surface, the first horizontal surface being connected to the first end surface, the first slope surface being connected, at an inclination, between the first horizontal surface and the second horizontal surface, the first horizontal surface and the first slope surface defining therebetween a first included angle, the first included angle being an obtuse angle;

wherein the lower surface comprises three sections, which are respectively a third horizontal surface, a second slope surface, and a fourth horizontal surface, the third horizontal surface being connected to the first end surface, the second slope surface being connected, at an inclination, between the third horizontal surface and the fourth horizontal surface, the third horizontal surface and the second slope surface defining therebetween a second included angle, the second included angle being an obtuse angle;

wherein the first end surface serves as a light incident surface of the light guide plate and the second horizontal surface serves as a light exit surface of the light guide plate;

wherein the light guide plate comprises a light incident portion and a light guide portion, the light incident portion being of a horn-like configuration, the light guide portion being of a rectangular parallelepiped configuration;

wherein the first horizontal surface and the third horizontal surface correspond to each other and are of the same size; the first slope surface and the second slope surface correspond to each other and are of the same size; and the third horizontal surface and the fourth horizontal surface correspond to each other and are of the same size; and wherein the first included angle and the second included angle are of the same angle.

The present invention further provides a backlight module, which comprises a backboard, a reflector plate arranged on a bottom plate of the backboard, a light guide plate that is described above and arranged on the reflector plate, a light source arranged on a sidewall of the backboard to correspond to a first end surface of the light guide plate, an optic film assembly arranged on the light guide plate, and a mold frame arranged on the backboard.

The optic film assembly is arranged above a second horizontal surface of the light guide plate and the reflector plate is arranged below a fourth horizontal surface of the light guide plate.

The efficacy of the present invention is that the present invention provides a light guide plate and a backlight module using the light guide plate. The light guide plate has a light incident surface that has an arc configuration. The light guide plate comprises an upper surface and a lower surface that have sides that are adjacent to the light incident surface and are respectively provided with a first slope surface and the second slope surface, so that large angle light, after being subject to an effect of convergence with the arc light incident surface, is subjected to total internal reflection at the first slope surface and the second slope surface to have the light guided into the light guide plate. The light guided into the light guide plate, after transmission and reflection, projects out through a light exit surface and passes through the optic film assembly to form a uniform planar light source provided to a liquid crystal panel, thereby improving light utilization and increasing light coupling efficiency. Further, since the light guide plate having the above-described structure demonstrates an excellent effect of convergence for light of all angles, the light guide portion of the light guide plate can be structured thinner without deteriorating light coupling efficiency, thereby facilitating a design of thinning of a backlight module. The present invention provides a backlight module, which involves a light guide plate having the above-described unique structure, in which the light guide plate has increased light utilization and a reduced thickness so that the backlight module has a reduced overall thickness and a bettered effect of light emission.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
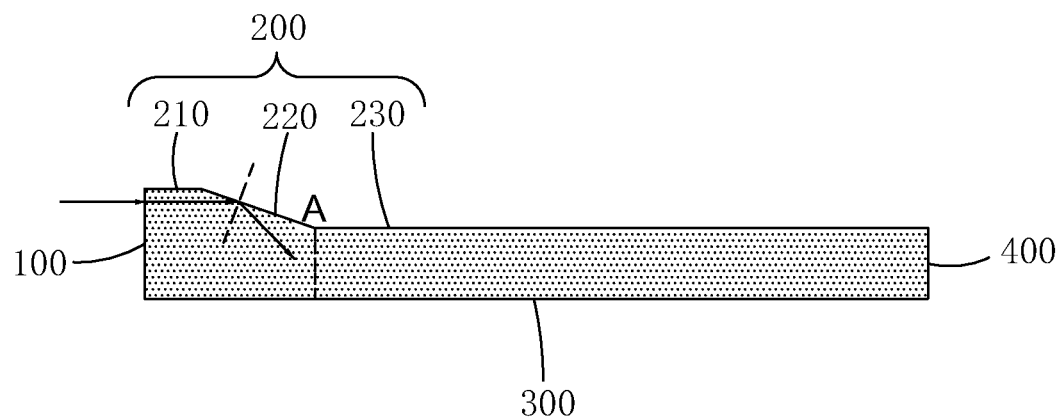
FIG. 1 is a cross-sectional view showing a conventional light guide plate.
Figure 2:
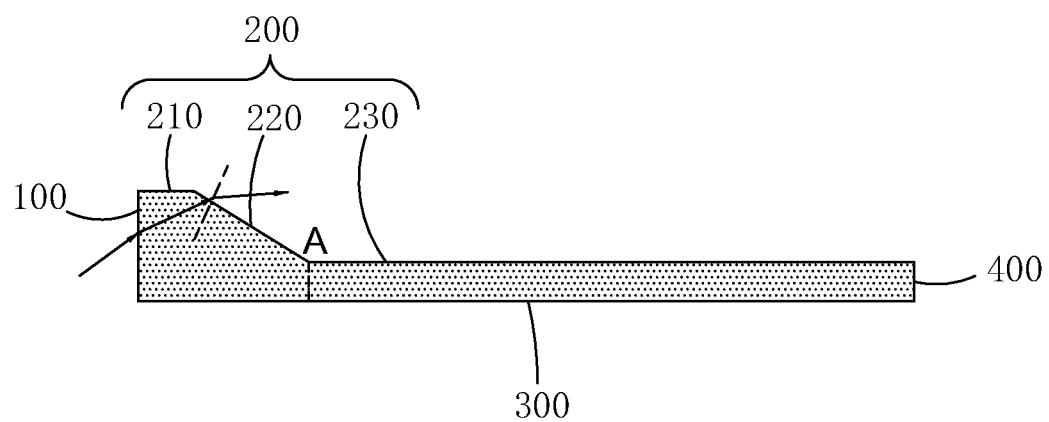
FIG. 2 is a cross-sectional view illustrating a design of thinning of a light guide portion of the light guide plate of FIG. 1.
Figure 3:
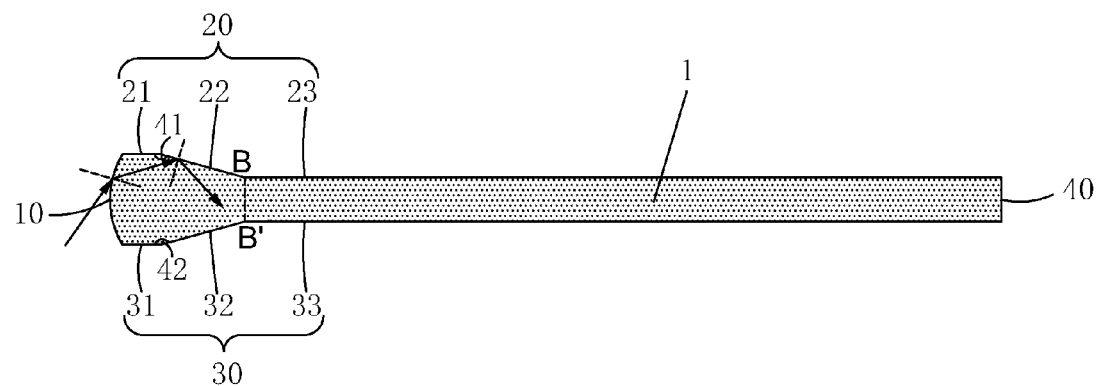
FIG. 3 is a cross-sectional view showing a light guide plate according to the present invention.

Referring to FIG. 3, the present invention provides a light guide plate 1, which comprises a first end surface 10, a second end surface 40 opposite to the first end surface 10, an upper surface 20 connected to upper ends of the first end surface 10 and the second end surface 40, and a lower surface 30 connected to lower ends of the first end surface 10 and the second end surface 40.

Specifically, the upper surface 20 comprises three sections, which are respectively a first horizontal surface 21, a first slope surface 22, and a second horizontal surface 23. The first horizontal surface 21 is connected to the first end surface 10. The first slope surface 22 is connected, at an inclination, between the first horizontal surface 21 and the second horizontal surface 23. The first horizontal surface 21 and the first slope surface 22 define therebetween a first included angle 41. The first included angle 41 is an obtuse angle.

The lower surface 30 comprises three sections, which are respectively a third horizontal surface 31, a second slope surface 32, and a fourth horizontal surface 33. The third horizontal surface 31 is connected to the first end surface 10. The second slope surface 32 is connected, at an inclination, between the third horizontal surface 31 and the fourth horizontal surface 33. The third horizontal surface 31 and the second slope surface 32 define therebetween a second included angle 42. The second included angle 42 is an obtuse angle.

Specifically, the first end surface 10 serves as a light incident surface of the light guide plate 1 and the second horizontal surface 23 serves as a light exit surface of the light guide plate 1.

Specifically, the first end surface 10 is of an arc configuration bulging outwardly of the light guide plate 1. By arranging the first end surface 10 as an arc configuration, the light guide plate 1 according to the present invention is allowed to converge light at a large angle so that a majority of the large angle light can be guided through such an effect of convergence into the light guide plate 1, thereby improving the utilization of light and increasing the coupling efficiency of the light guide plate 1.

A reference plane (illustrated with a phantom line) is connected between a connection point B between the first slope surface 22 and the second horizontal surface 23 and a connection point B' between the second slope surface 32 and the fourth horizontal surface 33. A portion of the light guide plate 1 from the reference plane to the first end surface 10 is a light incident portion and the light incident portion of the light guide plate 1 is of a horn-like configuration; and a portion of the light guide plate 1 from the reference plane to the second end surface 40 is a light guide portion and the light guide portion of the light guide plate 1 is of a rectangular parallelepiped configuration. The light guide portion of the light guide plate 1 has a thickness that is smaller than a thickness of the light incident portion of the light guide plate 1.

Specifically, the light incident portion of the light guide plate 1 comprises two portions, which are respectively a portion between the first horizontal surface 21 and the third horizontal surface 31 and a portion between the first slope surface 22 and the second slope surface 32.

The portion of the first horizontal surface 21 and the third horizontal surface 31 has a thickness that is constant in the entirety of the portion.

A thickness between the first slope surface 22 and the second slope surface 32 is gradually decreased in a direction from the first horizontal surface 21 to the second horizontal surface 23.

The light guide portion of the light guide plate 1 comprises only one portion that is located between the second horizontal surface 23 and the fourth horizontal surface 33. A thickness between the second horizontal surface 23 and the fourth horizontal surface 33 is constant in the entirety of the portion.

Preferably, the upper surface 20 and the lower surface 30 are of a symmetric arrangement.

Specifically, the first horizontal surface 21 and the third horizontal surface 31 correspond to each other and are of the same size.

Specifically, the first slope surface 22 and the second slope surface 32 correspond to each other and are of the same size. Preferably, the first included angle 41 and the second included angle 42 are of the same angle.

Specifically, the third horizontal surface 23 and the fourth horizontal surface 33 correspond to each other and are of the same size.

Specifically, to prevent a fraction of light to leak through the second slope surface 32 that is located at the lower side of the light guide plate 1, the second slope surface 32 is covered with black ink jet or white ink jet to increase utilization of light, or alternatively, the second slope surface 32 is covered with alternately arranged black and white ink jets so as to, in addition to increase of the light utilization, help eliminate a hot spot phenomenon at the light incident side of the light guide plate, thereby improving homogeneity of exit light of the light guide plate.

The present invention provides a light guide plate 1, which comprises a light incident surface that is arranged in the form of an arc configuration and a first slope surface 22 and a second slope surface 32 that are respectively arranged at side portions of an upper surface 20 and a lower surface 30 that are adjacent to the light incident surface so that large angle light, after being subject to an effect of convergence with the arc light incident surface, is subjected to total internal reflection at the first slope surface 22 and the second slope surface 32 to have the light guided into the light guide plate thereby improving the utilization of light and increasing the light coupling efficiency. Since the light guide plate 1 having the above-described structure demonstrates a bettered effect of convergence for light of all angles, the light guide portion of the light guide plate can be structured thinner without deteriorating light coupling efficiency, thereby facilitating a design of thinning of a backlight module.

Figure 4:
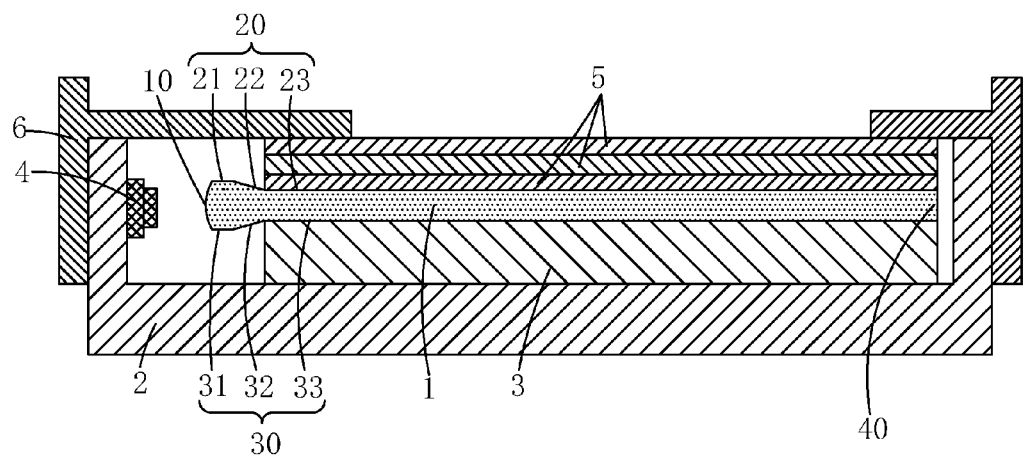
FIG. 4 is a cross-sectional view showing a backlight module according to the present invention.

Referring to FIG. 4, the present invention also provides a backlight module that involves the above-described light guide plate 1 and comprises a backboard 2, a reflector plate 3 arranged on a bottom plate of the backboard 2, a light guide plate 1 arranged on the reflector plate 3, a light source 4 arranged on a sidewall of the backboard 2 to correspond to a light incident surface 10 of the light guide plate 1, an optic film assembly 5 arranged on the light guide plate 1, and a mold frame 6 arranged on the backboard 2.

The light guide plate 1 has a structure that is illustrated in FIG. 3 and a detailed description has been given above.

Specifically, the optic film assembly 5 is arranged above a second horizontal surface 23 of the light guide plate 1. The reflector plate 3 is arranged below a fourth horizontal surface 33 of the light guide plate 1.

The above-described backlight module involves a light guide plate having the above-described unique structure, in which the light guide plate has increased light utilization and a reduced thickness so that the backlight module has a reduced overall thickness and a bettered effect of light emission.

In summary, the present invention provides a light guide plate and a backlight module using the light guide plate. The light guide plate has a light incident surface that has an arc configuration. The light guide plate comprises an upper surface and a lower surface that have sides that are adjacent to the light incident surface and are respectively provided with a first slope surface and the second slope surface, so that large angle light, after being subject to an effect of convergence with the arc light incident surface, is subjected to total internal reflection at the first slope surface and the second slope surface to have the light guided into the light guide plate. The light guided into the light guide plate, after transmission and reflection, projects out through a light exit surface and passes through the optic film assembly to form a uniform planar light source provided to a liquid crystal panel, thereby improving light utilization and increasing light coupling efficiency. Further, since the light guide plate having the above-described structure demonstrates an excellent effect of convergence for light of all angles, the light guide portion of the light guide plate can be structured thinner without deteriorating light coupling efficiency, thereby facilitating a design of thinning of a backlight module. The present invention provides a backlight module, which involves a light guide plate having the above-described unique structure, in which the light guide plate has increased light utilization and a reduced thickness so that the backlight module has a reduced overall thickness and a bettered effect of light emission.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A light guide plate, comprising a first end surface, a second end surface opposite to the first end surface, an upper surface connected to upper ends of the first end surface and the second end surface, and a lower surface connected to lower ends of the first end surface and the second end surface;

wherein the first end surface comprises an arc configuration bulging outwardly of the light guide plate;

wherein the upper surface comprises three sections, which are respectively a first horizontal surface, a first slope surface, and a second horizontal surface, the first horizontal surface being connected to the first end surface, the first slope surface being connected, at an inclination, between the first horizontal surface and the second horizontal surface, the first horizontal surface and the first slope surface defining therebetween a first included angle, the first included angle being an obtuse angle;

wherein the lower surface comprises three sections, which are respectively a third horizontal surface, a second slope surface, and a fourth horizontal surface, the third horizontal surface being connected to the first end surface, the second slope surface being connected, at an inclination, between the third horizontal surface and the fourth horizontal surface, the third horizontal surface and the second slope surface defining therebetween a second included angle, the second included angle being an obtuse angle; and wherein the first end surface serves as a light incident surface of the light guide plate and the second horizontal surface serves as a light exit surface of the light guide plate.

2. The light guide plate as claimed in claim 1, wherein the light guide plate comprises a light incident portion and a light guide portion, the light incident portion being of a horn-like configuration, the light guide portion being of a rectangular parallelepiped configuration.

3. The light guide plate as claimed in claim 2, wherein the light incident portion comprises two portions, which are respectively a portion between the first horizontal surface and the third horizontal surface and a portion between the first slope surface and the second slope surface.

4. The light guide plate as claimed in claim 3, wherein a thickness between the first horizontal surface and the third horizontal surface is constant in the entirety of the portion and a thickness between the first slope surface and the second slope surface gradually decreases in a direction from the first horizontal surface to the second horizontal surface.

5. The light guide plate as claimed in claim 2, wherein the light guide portion comprises a portion between the second horizontal surface and the fourth horizontal surface, a thickness between the second horizontal surface and the fourth horizontal surface being constant in the entirety of the portion.

6. The light guide plate as claimed in claim 1, wherein the first horizontal surface and the third horizontal surface correspond to each other and are of the same size; the first slope surface and the second slope surface correspond to each other and are of the same size; and the third horizontal surface and the fourth horizontal surface correspond to each other and are of the same size.

7. The light guide plate as claimed in claim 1, wherein the first included angle and the second included angle are of the same angle.

8. The light guide plate as claimed in claim 1, wherein the second slope surface is coated with black ink jet, white ink jet, or alternatively arranged black and white ink jets.

9. A backlight module, comprising a backboard, a reflector plate arranged on a bottom plate of the backboard, a light guide plate according to the claim 1 arranged on the reflector plate, a light source arranged on a sidewall of the backboard to correspond to a first end surface of the light guide plate, an optic film assembly arranged on the light guide plate, and a mold frame arranged on the backboard.

10. The backlight module as claimed in claim 9, wherein the optic film assembly is arranged above a second horizontal surface of the light guide plate and the reflector plate is arranged below a fourth horizontal surface of the light guide plate.

11. A light guide plate, comprising a first end surface, a second end surface opposite to the first end surface, an upper surface connected to upper ends of the first end surface and the second end surface, and a lower surface connected to lower ends of the first end surface and the second end surface;

wherein the first end surface comprises an arc configuration bulging outwardly of the light guide plate;

wherein the upper surface comprises three sections, which are respectively a first horizontal surface, a first slope surface, and a second horizontal surface, the first horizontal surface being connected to the first end surface, the first slope surface being connected, at an inclination, between the first horizontal surface and the second horizontal surface, the first horizontal surface and the first slope surface defining therebetween a first included angle, the first included angle being an obtuse angle;

wherein the lower surface comprises three sections, which are respectively a third horizontal surface, a second slope surface, and a fourth horizontal surface, the third horizontal surface being connected to the first end surface, the second slope surface being connected, at an inclination, between the third horizontal surface and the fourth horizontal surface, the third horizontal surface and the second slope surface defining therebetween a second included angle, the second included angle being an obtuse angle;

wherein the first end surface serves as a light incident surface of the light guide plate and the second horizontal surface serves as a light exit surface of the light guide plate;

wherein the light guide plate comprises a light incident portion and a light guide portion, the light incident portion being of a horn-like configuration, the light guide portion being of a rectangular parallelepiped configuration;

wherein the first horizontal surface and the third horizontal surface correspond to each other and are of the same size; the first slope surface and the second slope surface correspond to each other and are of the same size; and the third horizontal surface and the fourth horizontal surface correspond to each other and are of the same size; and wherein the first included angle and the second included angle are of the same angle.

12. The light guide plate as claimed in claim 11, wherein the light guide plate comprises a light incident portion and a light guide portion, the light incident portion being of a horn-like configuration, the light guide portion being of a rectangular parallelepiped configuration.

13. The light guide plate as claimed in claim 12, wherein a thickness between the first horizontal surface and the third horizontal surface is constant in the entirety of the portion and a thickness between the first slope surface and the second slope surface gradually decreases in a direction from the first horizontal surface to the second horizontal surface.

14. The light guide plate as claimed in claim 11, wherein the light guide portion comprises a portion between the second horizontal surface and the fourth horizontal surface, a thickness between the second horizontal surface and the fourth horizontal surface being constant in the entirety of the portion.

15. The light guide plate as claimed in claim 11, wherein the second slope surface is coated with black ink jet, white ink jet, or alternatively arranged black and white ink jets.

* * * * *